(12) United States Patent
Jonas (10) Patent No.: US 8,629,880 B2
(45) Date of Patent: *Jan. 14, 2014

(54) TWO DIMENSIONAL MEMORY ACCESS CONTROLLER

(75) Inventor: Jim Jonas, Tuscon, AZ (US)

(73) Assignee: Presagis, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,495

(22) Filed: Jul. 25, 2012

(65) Prior Publication Data

US 2013/0069965 A1    Mar. 21, 2013

Related U.S. Application Data

(63) Continuation of application No. 12/393,329, filed on Feb. 26, 2009, now Pat. No. 8,243,088.

(51) Int. Cl.
*G06F 12/02* (2006.01)
*G09G 5/39* (2006.01)

(52) U.S. Cl.
USPC .......................... 345/566; 345/531

(58) Field of Classification Search
USPC .......................... 345/531, 543, 545, 564, 566
See application file for complete search history.

(56) References Cited

U.S. PATENT DOCUMENTS 6,192,455 B1 * 2/2001 Bogin et al. ............. 711/154
2002/0163522 A1 * 11/2002 Porter et al. ............. 345/533

* cited by examiner

*Primary Examiner* — Jacinta M Crawford
(74) *Attorney, Agent, or Firm* — FSP LLC (57) ABSTRACT

A memory control device is adapted to derive a two dimensional location on a graphic display surface from address signals of a graphics processing unit (GPU), and to compare the derived two dimensional location to a two dimensional range of authorized locations corresponding to a subset of the display surface; and to modify the address signals of the graphics processing unit (GPU) if the address signals do not fall within the two-dimensional range of authorized locations corresponding to a subset of the display surface, and to propagate the address signals unmodified to a display memory otherwise.

13 Claims, 7 Drawing Sheets

TWO DIMENSIONAL MEMORY ACCESS CONTROLLER

PRIORITY

This application (U.S. application Ser. No. 13/557,495) claims priority as a continuation of U.S. application Ser. No. 12/393,329, filed on Feb. 26, 2009 now U.S. Pat. No. 8,243,088, and which is incorporated herein by reference in its entirety.

BACKGROUND

It may be desirable for some graphics systems to provide a layer of protection that goes beyond that available with traditional software techniques, something that will allow multiple software modules (e.g. users, processes, applications, etc) to run on the same graphics hardware while protecting the imagery produced by one module from being read or overwritten by any other module.

This concept allows developers to create systems that mix building blocks that are designed to high-security standards with others that are not, without compromising the secure elements of the system.

Such protection would normally require custom built hardware that implements the protection at the very lowest level, usually in the memory controller. As modern Graphics Processing Units (GPUs) have become as complex as the Central Processing Units (CPUs) that host them, it has become impractical to build an entire custom GPU of one or two hundred million transistors just to be able to make the relatively modest changes to its memory controller needed to provide such protection.

Furthermore, traditional memory mapper technology cannot provide the needed protection for at least two reasons. First, one dimensional memory mapper schemes are not sufficiently fine grained to allocate memory in the narrow slices needed to assign memory segments that are only a few dozen pixels wide, as would be needed to define a two-dimensional window on a GPUs display screen.

Even if such a scheme were to be expanded, it would have to break each megabyte of the memory into roughly 16K chunks of 16 pixels each in order to provide acceptable granularity. In other words, memory required to store the map would likely need to be comparable in size and faster than the memory that it was mapping, if it were to provide acceptable performance.

Second, GPUs typically do not have memory mappers between their rendering pipelines and their memory interfaces. Only the host processors typically have such mappers and while they might be used to restrict access by the hosts various tasks to GPU memory in a coarse way, control of the GPU's rendering logic is assigned as a whole. Once any task has control of it, it can be used to read any part of the GPU's memory, even if the host's memory mapper has blocked direct access of that region by the host itself.

What is needed is a relatively simple device that can be installed between a GPU and display memory that will allow definition of multiple two-dimensional regions in the display buffers that can only be read or written by the task that 'owns' them. The device may also provide protection in coarser one-dimensional blocks to the rest of GPU memory for use as scratch pad space.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more devices. The particular distribution and choice of logic is a design decision that will vary according to implementation.

In accordance with the devices, procedures, and systems described herein, a data processing system may include a display, the display having a display surface, and logic to modify the value of address signals of a graphics processing unit (GPU) if the address signals do not fall within a two-dimensional range of authorized pixel locations corresponding to a subset of the display surface, and to propagate the address signals unmodified to a display memory otherwise. The data processing system may include logic to modify a value of the address signals. The data processing system may include logic disposed between the GPU and a display memory. The two dimensional range of authorized pixel locations may be identified by a horizontal range and a vertical range, and the horizontal range may include multiple values each corresponding to a column of the display, and the vertical range may include multiple of values each corresponding to a row of the display. The system may include logic to set the horizontal range and the vertical range in increments.

The system may further include logic to redirect accesses within a fixed refresh buffer address range to a current display buffer address range, such as logic to redirect unauthorized READs to a fixed address range and logic to redirect unauthorized WRITEs to a fixed address range.

A data processing system in accordance with the devices, procedures, and systems described herein may include a display, the display having a display surface, and logic to intercept addresses between a graphics processing unit (GPU) and a display memory, and to modify values of unauthorized addresses but not modify values of authorized addresses. The system may include logic to pipeline the addresses, and logic to pass data directly between the GPU and the display memory. The system may include logic to re-direct accesses in a fixed range corresponding to a refresh buffer to one of multiple selectable frame buffers.

Figure 1:
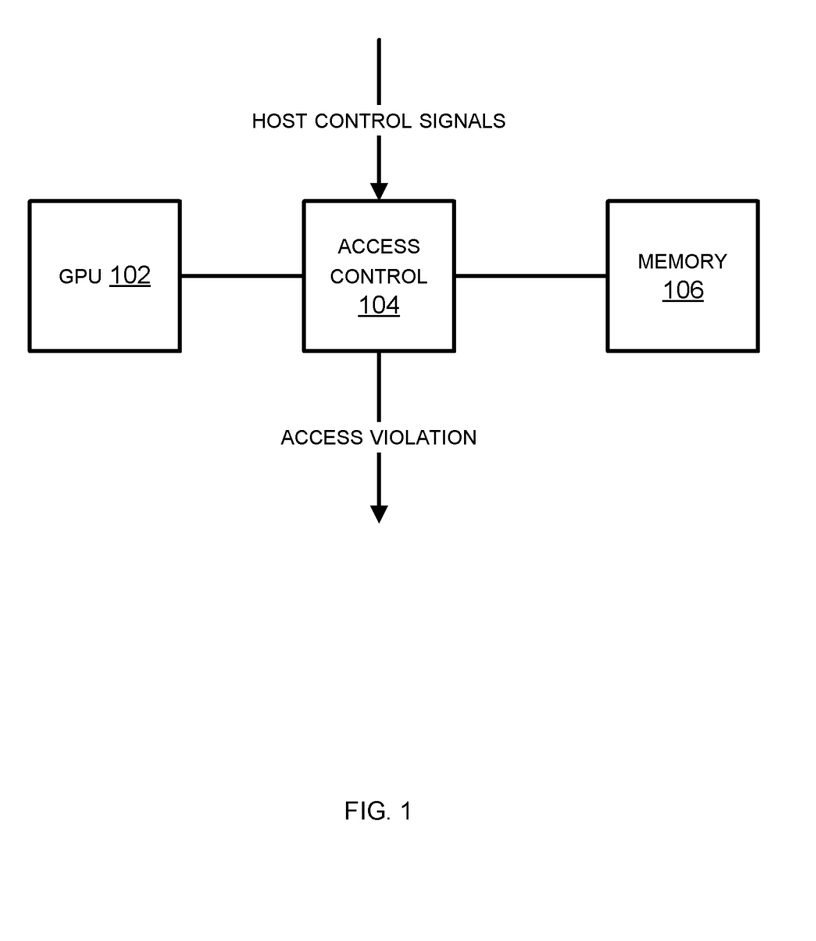
FIG. 1 is a block diagram of an embodiment of a Graphical Processing Unit (GPU) coupled via control logic to memory.

FIG. 1 is a block diagram of an embodiment of a Graphical Processing Unit (GPU) 102 coupled via access control logic 104 to memory 106. The memory 106 may be random access memory (RAM) or other types of memory. Access control logic 104 comprises inputs for address and control lines from the GPU 102 and outputs to the memory 106, propagating signals from the GPU address and control lines to the memory 106. Access control logic 104 further comprises a control input, for example an IC 2 port for providing control signals to the access control logic 104 from the host. An output signal may be provided either to the GPU 102 or to the host processor, or both, which indicates an attempted READ or WRITE memory access violation.

In some embodiments, the access control logic 104 may be an FPGA that connects between the GPU 102 and a GDDR3 memory array. Variants may be produced for use with other types of memory. In one embodiment, the access control logic 104 is controlled by an I2C port that allows the host to define windows and their owners. The access control logic 104 may also produce a signal that may be used to interrupt the host processor and/or the GPU 102. The access control logic 104 may toggle this signal whenever it detects a memory access violation.

In some graphics systems, communication between the GPU 102 and, for example, DDR RAMs, is synchronous with a memory clock running at up to ~300 MHz. The GPU 102 may initiate READ and WRITE by placing appropriate commands and address values on the control and address pins of the memory 106 (e.g. RAM) which the RAM 106 then samples on the next clock edge. That interaction defines the address and control transaction, but data isn't actually passed between the GPU 102 and the RAM 106 until some fixed number of clock cycles later. The number of clocks that elapse between the READ or WRITE commands may be set by registers in the memory controller and is referred to as 'latency'.

Figure 2:
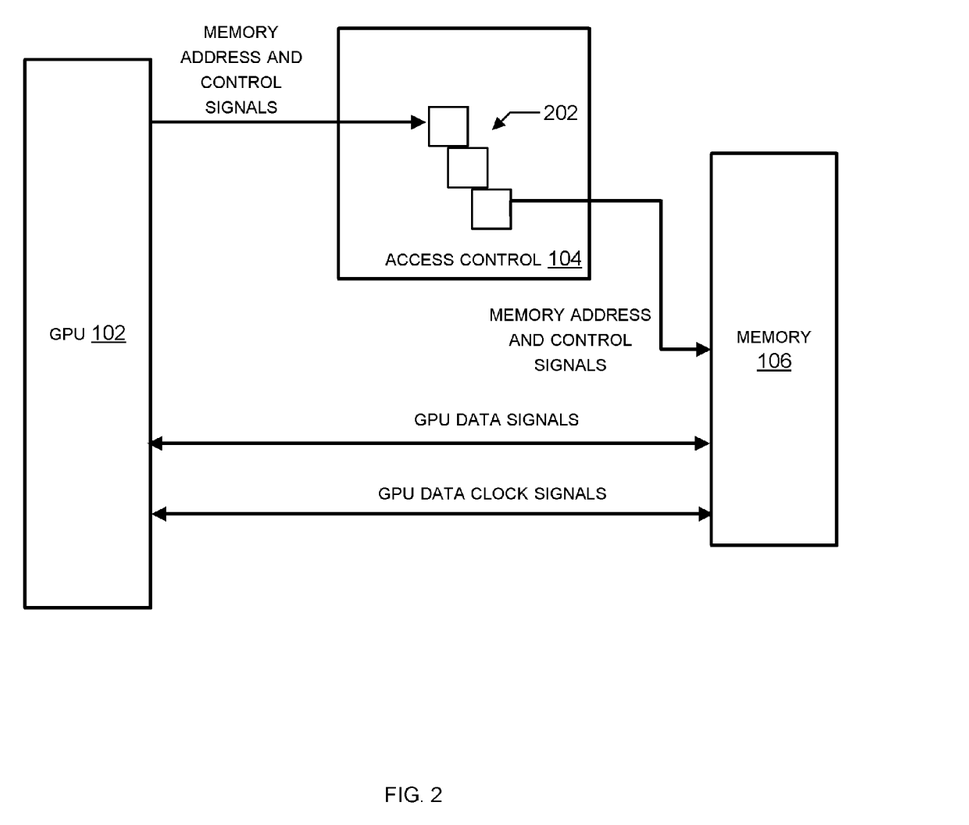
FIG. 2 is a block diagram showing more details of one embodiment of control logic.

FIG. 2 is a block diagram showing more details of one embodiment of access control logic 104. GPU control and address signals are provided to the access control logic 104 and pipelined or otherwise delayed 202 before being output to memory 106. GPU data signals are provided directly to the memory 106 as are clock signals for the GPU data signals.

This enables the access control logic 104 to intervene with unauthorized memory accesses and re-direct them to safe locations in memory 106, where they can not be used for harmful purposes.

Control and address lines between the GPU 102 and the memory 106 (e.g. RAM) are fed through the access control logic 104 (e.g. FPGA) and then the logic 104 is programmed to pipeline the address and control signals such that whatever goes into the logic 104 doesn't come out until 2 or 3 clocks (for example) later. The data lines (which may be transferring data on both edges of the clock and therefore at twice the rate at which the address and command lines run) and their clocks may be coupled between the GPU 102 and the RAM 106, bypassing the access control logic 104, thereby avoiding many signal integrity problems. This may also allow use of the GPU's 102 fine-tuning logic for adjustment of the data sample points in (for example) fractional nanosecond increments to allow for signal propagation delays on a printed circuit board.

In effect, the access control logic 104 may hide its function in the latency period on the slow side of the RAM 106, and may not need to connect to the fast side of the RAM 106 at all.

As long as normal read and write latency counts in the GPU 102 are increased to match the depth of the logic 104 pipeline, the GPU 102 may not even know the logic 104 is there. It may interact as though the RAM 106 is rather slow to decode its commands, while still running at a respectable clock rate, not an uncommon situation.

This pipeline delay may also allow the logic 104 a comfortable period of time to examine the address for each command and decide whether the GPU 102 signals should be allowed to pass through as-is or not. If the logic 104 decides that the GPU 102 is trying to perform an un-authorized access, it may force the appropriate address bits to a different value, which will have the effect of moving the reads or writes to some 'safe' area (for example, off-screen).

Figure 3:
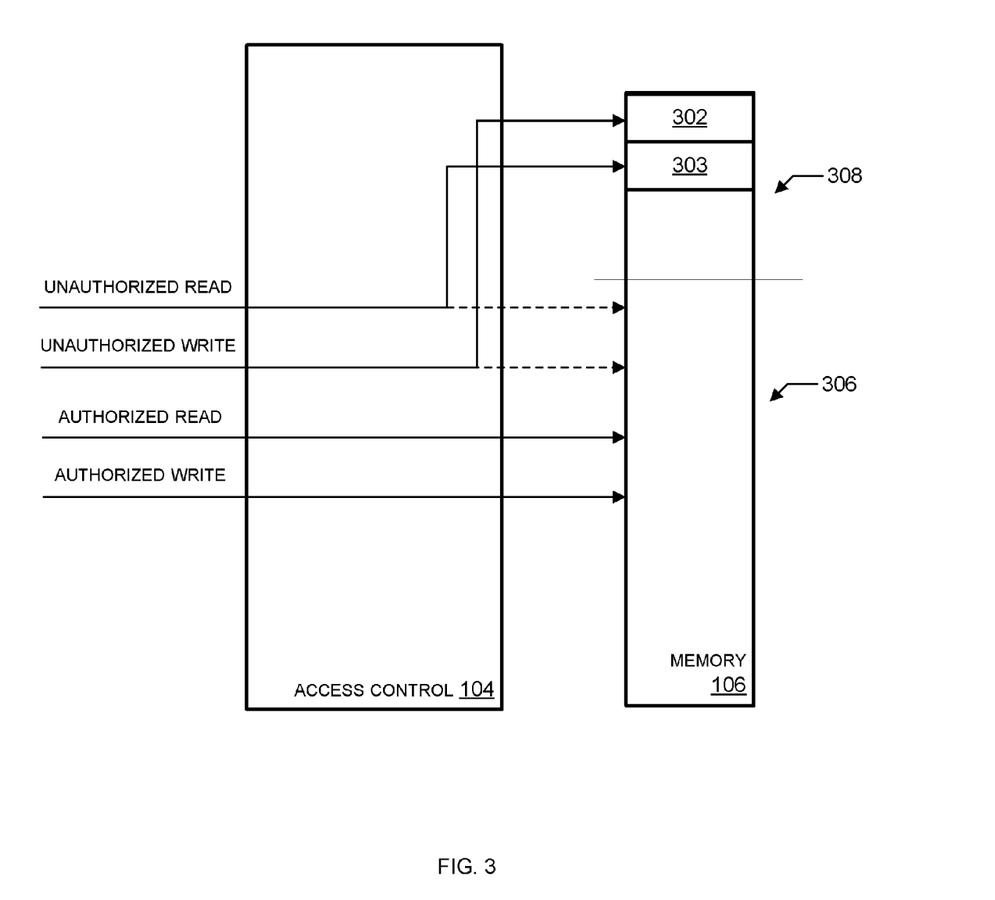
FIG. 3 is a block diagram of an example of an address redirection process.

FIG. 3 is a block diagram of an example of an address redirection process. An authorized READ memory access is provided to the access control logic 104 from the GPU 102. The READ is determined to be authorized based on comparisons of the address signals and the two-dimensional display area of the display memory 106 which is assigned to the process (e.g. user, module, task, application, etc.) making the request. If the memory access falls within the assigned window (e.g. area 306), the address is propagated through to the memory 106 and the data is read from there onto the GPU data buses. If, however, it is a non-authorized READ memory access, the address is changed by the access control logic 104 so that the READ is perform from a safe area 303 of memory, which may contain just junk. The attempted READ of the unauthorized area of memory 106 is not performed. Likewise, for a WRITE access, if the WRITE address is authorized, the access control logic 104 passes the address through to the memory 106 and the data on the GPU data bus at that time is written to that address. Otherwise, the address provided by the GPU 102 is changed to a safe area 302, which is perhaps off screen 308, where the data that is on the GPU data bus will then be written. The applied address to the memory 106 is not the one supplied from the GPU 102, but rather the address of the safe area 302.

The safe area 303 may be an off-screen area normally only used to identify screen refresh cycles. This area 303 may be filled with random patterns or error messages. Unauthorized WRITE may be directed to a safe area 302 away from the unauthorized READ buffer 303 and it's error messages.

When the access control logic 104, e.g. FPGA, detects an illegal memory access, it may provide a signal to interrupt the host processor and/or the GPU 102. GPIO signals on most GPUs may be programmed to interrupt the host and may be used to sense the transitions of this signal.

Registers may be used to initialize and control the access control logic 104. They may be loaded via an I2C port. Exemplary registers are described herein.

The access control logic 104 may not function as a memory mapper in the traditional sense. For example, it may not redefine the address of any location in memory 106 except as a means of blocking access to it. It may filter out disallowed accesses, pointing them at an otherwise unused section of memory 106 while allowing authorized ones to go to their specified address. Unauthorized READS may be redirected to an address range 303 that may only be written by the kernel, while unauthorized WRITES may be directed to a 'write only' region 302 of memory 106 (or another memory) so that the no information may be passed between different tasks through these re-directed address spaces.

The logic 104 that decides whether a particular access is allowed or disallowed may allow processes to define two dimensional areas within the memory 106 instead of the linear block-by-block allocation performed by most memory mappers, including the mappers built into most modern host processors. The logic 104 may also allow the user to define coarse (e.g. 4K byte) one dimensional blocks in memory 106 that are outside of the display buffer address spaces, to provide the various tasks with protected storage for textures and other scratch requirements.

Figure 4:
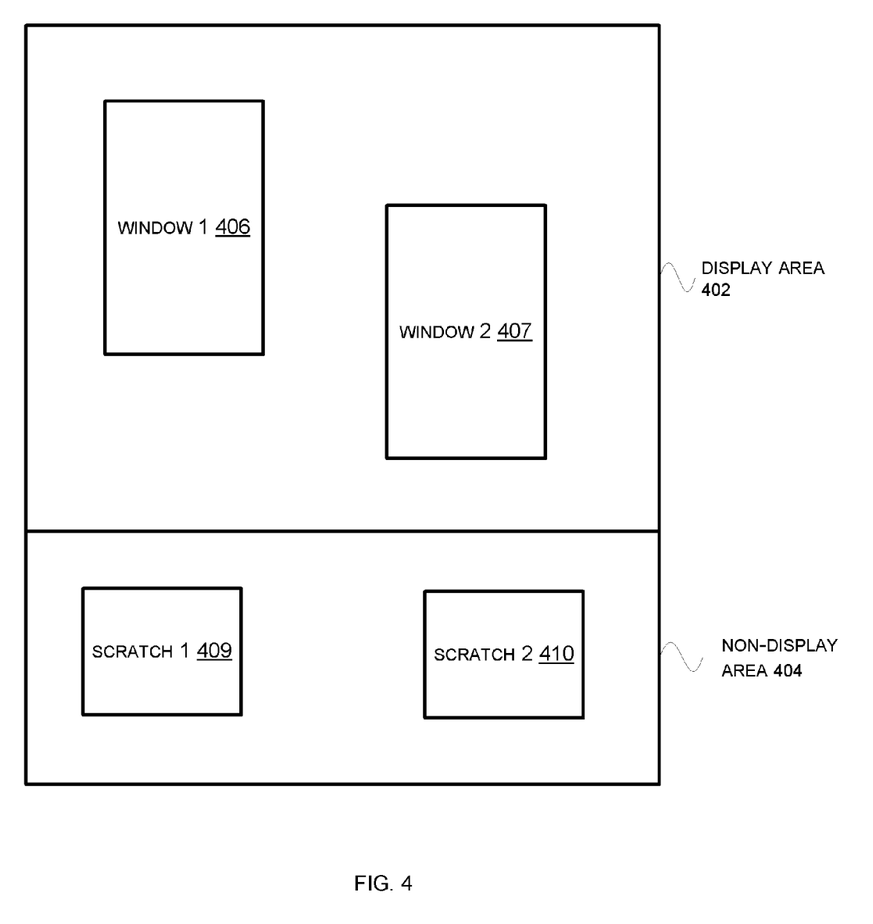
FIG. 4 is a block diagram illustrating an embodiment of two-dimensional areas of memory assigned to different processes.

FIG. 4 is a block diagram illustrating an embodiment of two-dimensional areas of memory assigned to different processes. Window 1 406 is assigned to process 1 and the Window 2 407 of the display area 402 is assigned to process 2. The two processes may have access to scratch areas 409, 410 off screen 404 which may be used, for example, to store textures.

In order to simplify the access control logic 104 (e.g. an FPGA of reasonable cost may operate at around 100 to 300 MHz), certain simplifying assumptions may be made about the arrangement and placement of the frame buffers used to create the displayed image:

1) In this example a frame buffer may be either 1K×2K (8 MBytes) or 2K×2K (16 MBytes) pixels in size (software selectable).

2) In this example, there may be either two or four frame buffers (software selectable) which are adjacent to each other.

3) In this example, the block of two or four frame buffers may have an additional 'phantom' frame buffer (e.g. just above them in the address space) to allow screen refresh cycles to be identified so that memory access control may be bypassed on screen refresh cycles.

Thus, between twenty-four and 80 MBytes may be reserved for dedicated frame buffer space that may be positioned in memory under software control, for example by mechanisms described below.

In some embodiments, the access control logic 104 implements two 2K bit wide registers for each of sixteen users. For purpose of this description, these two registers may be named XMapReg and YMapReg. Bits 0-2047 of XMapReg may correspond to columns 0-2047 of the display buffer, while bits 0-2047 of YMapReg correspond to rows 0-2047 of the display buffer. The access control logic 104 may treat any pixel x,y in the display buffer that has bit y set in YMapReg and bit x set in XMapReg to be owned by the current owner (e.g. as set in another register, UserReg), and therefore accessible by that owner. If either bit y in YMapReg or bit x set in XMapReg is not set, the current owner (e.g. user, process, etc.) does not have access to the pixel at x,y. This arrangement has the advantage of allowing a window of size x,y to be specified by a bit map of x+y elements instead of x*y elements, making it easier to fit in an FPGA or other component of reasonable size.

Figure 5:
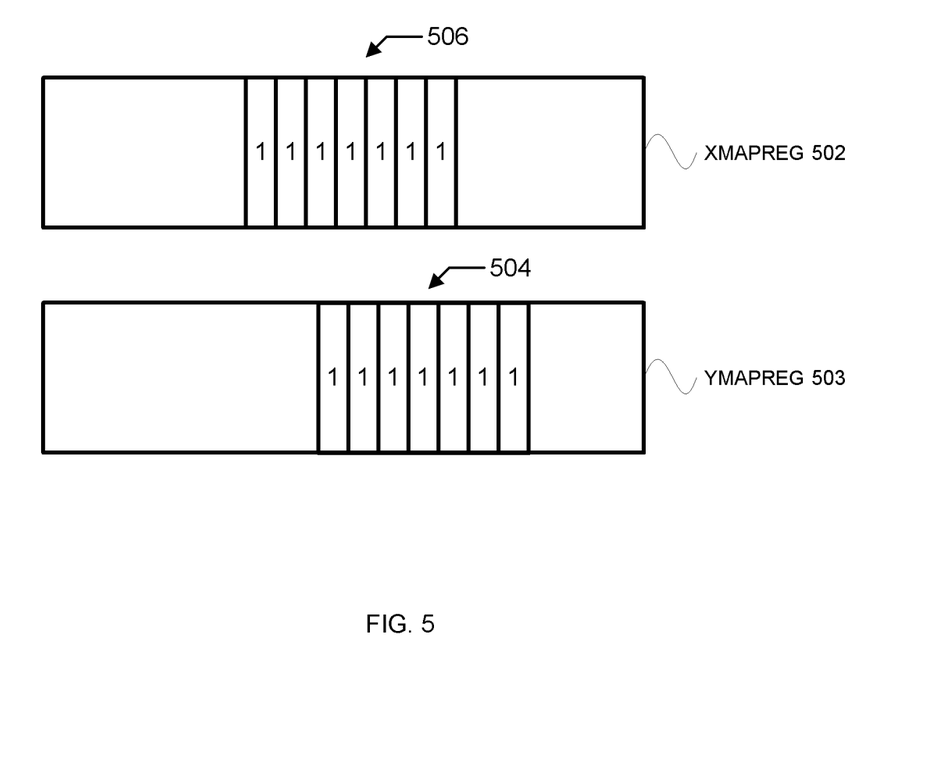
FIG. 5 is a block diagram of an embodiment of a two-dimensional memory mapping device comprising a register for mapping pixels of the X dimension and another register for mapping pixels of the Y dimension.

FIG. 5 is a block diagram of an embodiment of a two-dimensional memory mapping device comprising a register 502 for mapping pixels of the X dimension and another register 503 for mapping pixels of the Y dimension. In one embodiment, all bits of the mapping registers 502, 503 are cleared, e.g. set to zero, and then set (e.g. to one) in XMapReg 502 if they fall within the range of the X values of an owner's assigned graphical window, and likewise set in YMapReg 503 if they fall within the Y range of the owner's graphical window.

For example, to define a window for user 'n' with a lower left corner at pixel x1, y1 and an upper right corner at pixel x2, y2, first set UserReg to 'n'. Next set all bits in the range x1 to x2 inclusive (506) in XMapReg 502 to 1, and clear all other bits in XMapReg 502. Set all bits in the range y1 to y2 inclusive (504) in YMapReg 503 to 1 and clear all other bits in YMapReg 503.

If UserReg is set to 'n', attempts to READ or WRITE any pixels inside of User n's window will work as usual, while attempts to READ or WRITE any pixels outside of User n's window will fail. 'Fail' means that no WRITE to this display area will occur when writes are attempted and READs will return data not from the addressed location in memory 306, but instead from some safe location 303. Many modern GPUs use DDR RAMs that access memory in bursts of some fixed length, four being a popular length. For example, a graphics system may use 128 bit wide RAM arrays that read or write 512 bits/16 pixels at a time. It may be possible to block READs and WRITEs to individual pixel, but the penalty in both speed and complexity may be large.

In some embodiments, window boundaries may be set to fall on boundaries used by DDR RAM bursts, so that windows are multiples of sixteen pixels wide and one pixel high, or four pixels wide and four high, depending on how the memory locations are mapped onto the surface of the display device.

In these situations, the size of YmapReg 503 and XmapReg 502 may be made smaller by a factor of four or sixteen each, depending on the memory organization of the particular GPU and RAM chips. This may provide valuable savings in on-chip memory requirements for the logic 104.

Figure 6:
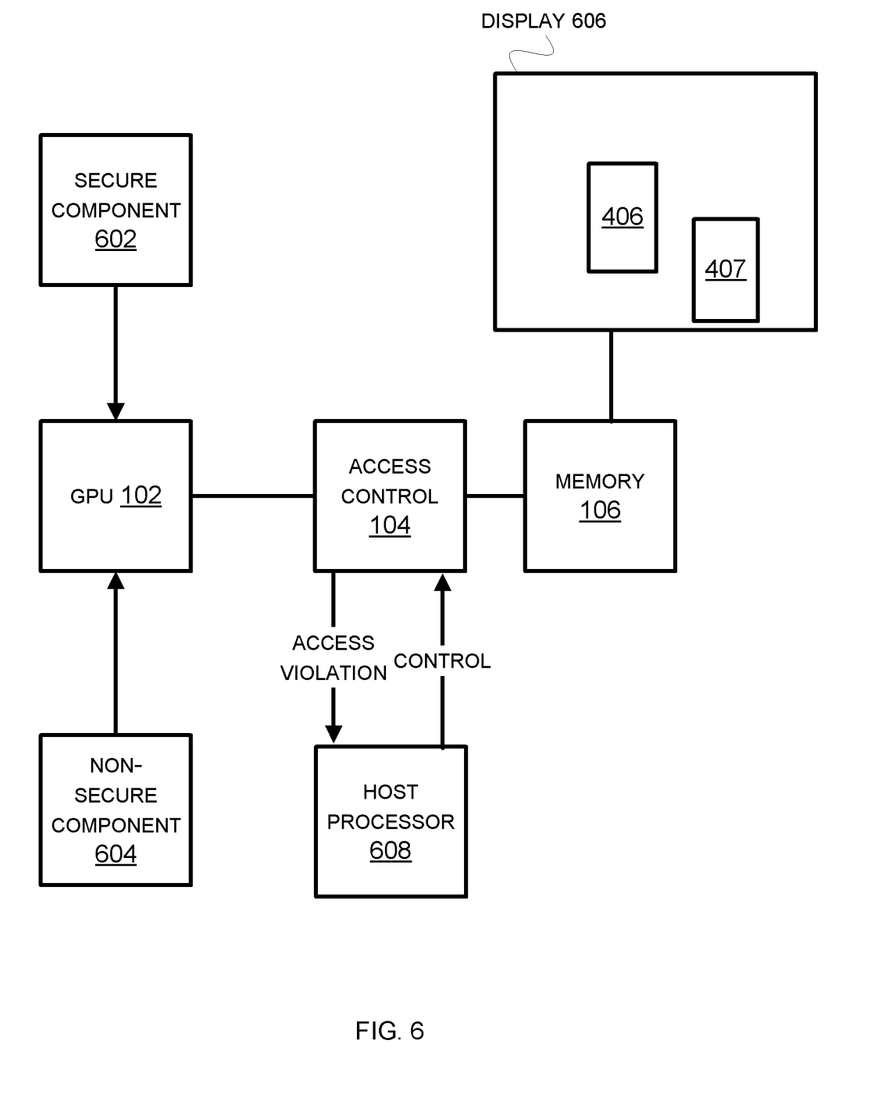
FIG. 6 is a block diagram of a system in accordance with the present invention.

FIG. 6 is a block diagram of a system in accordance with the present invention. A secure software module 602 and a non-secure software module 604 share the utilization of the GPU 102. It is desirable that the non-secure module 604 may not interfere with or otherwise access in any way any display area and associated off-screen areas of memory 106 not associated with window 407. The access control logic 104 is interposed between these address lines and/or control lines of the GPU 102 and the memory 106. Graphical operations of the secure module 602 are assigned an area 406 of the display 606. The graphical operations of the secure module 602 are secured to affect only areas of memory 106 associated with window 406. Graphical operations originating from the non-secure component 604, which is assigned region 407 of display 606, and restricted to areas of memory 106 affecting region 107. Access control logic 104 provides separation between the secure display area 406 and display area 407 in accordance with the manners described herein. A memory access violation may result in a signal to the host processor 608. The described embodiment involves software modules, but one skilled in the art will appreciate that modes 602 and 604 may represent other types of logic (e.g. combinations of software and hardware), as well as physical devices (e.g. telemetry components), or combinations of physical devices and logic of various kinds.

Figure 7:
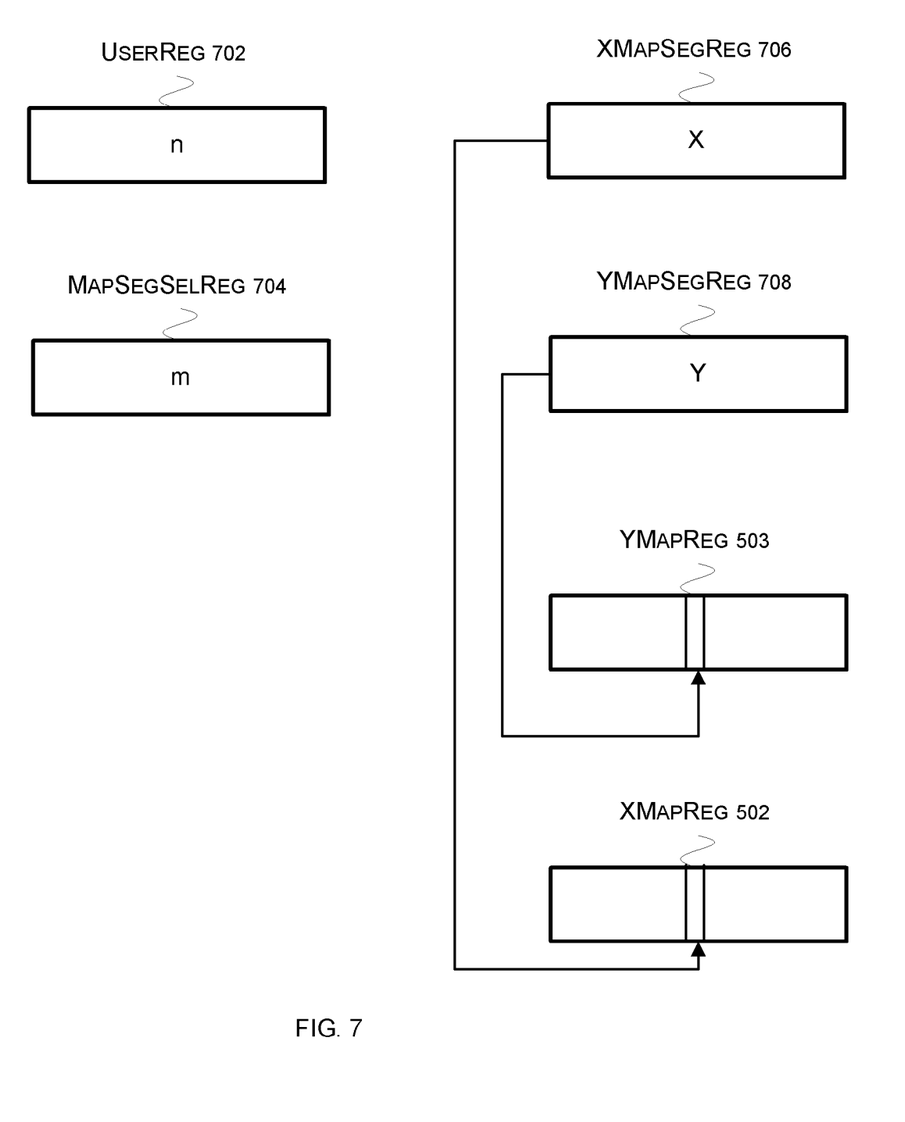
FIG. 7 is a block diagram illustrating an embodiment of a register arrangement for setting a user's X and Y mapping registers.

FIG. 7 is a block diagram illustrating an embodiment of a register arrangement for setting a user's X and Y mapping registers. In some embodiments, separate X and Y mapping registers may exist for each user of the system. Such an arrangement might save significant amounts of time switching user context because the mapping register could be loaded once for each user. However, this arrangement might require significantly more register space. In another embodiment, a single pair of mapping registers may be employed for all users of the system and loaded dynamically as a context switches between users. This may save register space but may incur a penalty in terms of performance during context switches.

In the embodiment of FIG. 7, the contents of the user register 702 selects the current user (n). A map segment select register 704 is loaded with a value (m) that specifies the current thirty-two bit segment from the X and Y mapping registers (502 and 503, respectively). Two segment registers 706, 708 are loaded. One register 706 specifies a value to load into segment m of the XmapReg 502. Another register 708 is loaded with the value to set into the segment m of YmapReg 503. The value m in the segment select register 704 may be incremented, and the two segment registers 706 and 708 updated to set the mapping registers YmapReg 503 and XmapReg 502 segment by segment. This may occur at the switch of the user context, or in the case of separate X and Y mapping registers for each user, may occur at system initialization or as users are added or removed.

In some embodiments, the windows of two users may overlap or even be identical regions of the display. Even if the logic 104 allows the windows of two users to overlap, the system software that allocates windows in the first place may restrict overlap. Also, having two users share a window, or part of a window, might be useful for some applications.

In some embodiments, the frame buffer memory 106 may comprise either two or four buffers, each being either eight or 16 MBytes in size, plus address space reserved for a buffer to be used for refresh and to store data to return for illegal READS. This arrangement may facilitate the identification of screen refresh READs for special handling.

In a typical graphics system, two kinds of memory cycles may take place. One kind comprises the normal READs and WRITES to create and manage the imagery on the display(s). Another kind comprises READs that the GPU's 102 screen refresh logic uses to fetch image data from the current display buffer to convert to a video signal to be sent to the display(s).

The access control logic 104 may be applied to the first type of memory accesses, blocking (e.g. re-mapping) any operations that the current user (e.g. process) is not authorized to perform. The second type of memory accesses may bypass the access control logic 104 regardless of the current user.

One challenge is to differentiate these two types of memory accesses. A typical procedure for generating a video display is for the GPU 102 to display a completed image in buffer 'A' while the process code is executing to create in buffer 'B' the next image to be displayed. When the new image in buffer 'B' is completed, a command to display the just completed image in buffer 'B' is issued to the GPU 102 while the process proceeds to create in buffer 'A' the next image to display. Consequently, the access control logic 104, which may only has access to memory control and address signals, cannot easily distinguish between the memory accesses that originate from processes, and those originating from the GPU's 102 screen refresh operations.

To address this problem, screen refreshes may all READ from a certain buffer address range. The access control logic 104 may be adapted to re-direct READs to this range to one of the actual display buffers. In other words, instead of commanding the GPU 102 to refresh the screen from buffer 'A', 'B', 'C', or 'D', the GPU 102 may be configured to always get screen refresh data from buffer 'E', which the access control logic 104 translates to buffer 'A', 'B', 'C', or 'D', for example based on the settings of bits 10-11 of a register (e.g. FbufReg, below).

In a typical graphics system, the host configures the GPU 102 to switch display buffers via a command to display from the new buffer address, and the GPU 102 then reads the screen refresh data directly from that buffer. In a system operating according to the principles described herein, the host configures the GPU 102 to always refresh from the same buffer, and the access control logic 104 is configured to translate READs to that buffer to one of the actual frame buffers.

Configuring screen refreshes to occur in a fixed address range that only secure, trusted processes may access may simplify differentiation of screen refresh memory accesses from unauthorized memory accesses masquerading as screen refresh memory accesses. Authorization to access the refresh buffer's address range may be restricted to a trusted system process.

In this scenario, all refresh accesses are re-directed from the actual addresses that correspond to the phantom (refresh) buffer. The (phantom) refresh buffer address space is thus available for storage of error messages and images that may then be substituted for the data during unauthorized READ attempts.

In some embodiments, the 8 MB buffers may be organized as 2K pixels wide by 1K lines high, while 16 MB buffers may be 2K wide by 2K high. These settings assume thirty-two bit pixels. An example register below sets the base address of this buffer space within the GPU's 102 memory and selects between count, size, and refresh buffer options.

Frame Buffer Base Address Register:
FBufReg: Bit 0—Address bit 25—not used if four buffers are enabled OR
if 2K×2K buffer is selected, but not both
Bit 1—Address bit 26—not used if four buffers are enabled AND
if 2K×2K buffer is selected
Bit 2—Address bit 27
Bit 3—Address bit 28
Bit 4—Address bit 29—MSB address bit in a 512 MB RAM space
Bits 5-7—not used
Bit 8—0=select 2K×1K buffers, 1=select 2K×2K buffers
Bit 9—0=allocate two buffers, 1=allocate four buffers
Bits 10-11—Refresh buffer number
Bits 12-31—not used The following is an exemplary register to specify the number of the current user. Valid user numbers are 0-15.

User Register:
UserReg: Bits 0-3=The number of the current user.
Bits 4-31—not used The XMapReg register 502 and YMapReg register 503 may each be 2K bits wide. It may be inconvenient to handle registers that are that wide all in one piece. Thus in some embodiments, additional registers may be used to logically allocate XMapReg 502 and YMapReg 503 as sixty-four segments of thirty-two bits each, with a register (e.g. MapSegSelReg 704) being used to select the segment that is currently being read or written. Both XMapReg 502 and YMapReg 503 may be 2K bits wide, with the thirty-two bits of segment 'm'

(as selected by loading 'm' into MapSegSelReg 704) of XMapSegReg 706 corresponding to columns (m*32) to (m*32+31). Likewise, the bits of segment 'm' (as selected by loading 'm' into MapSegSelReg 704) of YMapSegReg 708 correspond to rows (m*32) to (m*32+31).

Therefore, to load both maps for the current user (as specified by the number in UserReg 702), one procedure is to 1) write a 0 into MapSegSelReg 704, 2) load the mask for columns 0-31 into XMapSegReg 706, 3) load the mask for rows 0-31 into YMapSegReg 708, 4) increment MapSegSelReg 704, 5) load the next thirty-two columns and rows into XMapSegReg 706 and YMapSegReg 708 respectively, and 6) so on until MapSegSelReg 704=64.

Map Segment Select Register

MapSegSelReg: Bits 0-5=The number of the thirty-two bit segment to be accessed in XMapReg 502 and YMapReg 503

Bits 6-31—not used

X Map Segment Register—This register accesses a thirty-two bit segment of XMapReg 502 as described above.

XMapSegReg: Bits 0-31=Bits (m*32) to (m*32+31) of XmapReg where 'm' is the number currently in MapSegSelReg Y Map Segment Register—This register accesses a thirty-two bit segment of YMapReg 503 as described above.

YMapSegReg: Bits 0-31=Bits (m*32) to (m*32+31) of YmapReg where 'm' is the number currently in MapSegSelReg 704

Areas of the GPU's 102 memory that are not used as display buffers may be mapped with a scheme similar to the two-dimensional one described above, but only in one dimension and at a much coarser resolution. For example, an entire 512 MB memory space available to the GPU 102 may be divided into 8,192 blocks of 64 Kbytes each. There may be sixteen Linear map Registers (LinMapReg), one for each of sixteen users. Each LinMapReg may be 8,192 bits long with each bit corresponding to one of the 64 Kbyte blocks of memory 106.

Bit 0 of LinMapReg may correspond to the first 64 Kbytes of memory 106, bit 1 of LinMapReg may correspond to the second 64 Kbytes of memory 106, and so on, up through bit 8,191 which may correspond to the last 64 Kbytes of memory 106.

If a bit corresponding to a particular 64 Kbyte segment of memory 106 is set to '1' in the LinMapReg of the current user, that block may be accessible by the current user. If not, READs and WRITES may be steered to reserved addresses as in the two-dimensional case above.

The bits in the LinMapReg registers that correspond to the currently defined display buffer space as set in the FbufReg above may be ignored, with accessibility being determined by the 2-D map logic described above.

As in the previous case, the 8,192 bits of LinMapReg may be broken into 256 segments of thirty-two bits each, with LinSegSelReg determining which of the 256 of LinMapReg are currently accessed by LinMapSegReg.

For example, in order to load the first thirty-two bits of the 8,192 bit wide LinMapReg, first write a 0 into LinSegSelReg and then write the desired thirty-two bit value into LinMapSegReg. In order to load the last thirty-two bits of LinMapReg, first write 255 into LinSegSelReg and then write the data value into LinMapSegReg.

Linear Map Segment Select Register

LinSegSelReg: Bits 0-7=The number of the thirty-two bit segment to be accessed in LinMapReg Bits 8-31—not used Linear Map Segment Register—The actual Linear Map Register may be 8,192 bits wide. This registers accesses a thirty-two bit segment of it as described above.

LinMapSegReg: Bits 0-31=Bits (m*32) to (m*32+31) of LinMapReg where 'm' is the number currently in LinSegSelReg Those having skill in the art will appreciate that there are various logic embodiments by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A memory control device adapted to:
    derive a two dimensional location on a graphic display surface from address signals of a graphics processing unit (GPU);
    compare the derived two dimensional location to a two dimensional range of authorized locations corresponding to a subset of the display surface; and
    modify the address signals of the graphics processing unit (GPU) if the address signals do not fall within the two-dimensional range of authorized locations corresponding to a subset of the display surface, and to propagate the address signals unmodified to a display memory otherwise.

2. The memory control device of claim 1, further adapted to re-direct a data value by modifying a value of the address signals.

3. The memory control device of claim 1, adapted to modify the address signals of the GPU by operating logic disposed between the GPU and the display memory.

4. The memory control device of claim 1, further adapted to identify the two dimensional range of authorized locations by a horizontal range and a vertical range.

5. The memory control device of claim 4, further comprising:
    the horizontal range comprising a plurality of values each corresponding to a column of the display, and the vertical range comprising a plurality of values each corresponding to a row of the display.

6. The memory control device of claim 4, further adapted to set the horizontal range and the vertical range in increments.

7. The memory control device of claim 1, further adapted to redirect addresses within a fixed refresh buffer address range to a current display buffer address range.

8. The memory control device of claim 1, further adapted to redirect unauthorized READs to a fixed address range.

9. The memory control device of claim 1, further adapted to redirect unauthorized WRITEs to a fixed address range.

10. A memory controller comprising:
    logic to intercept addresses between a graphics processing unit (GPU) and a display memory, and to modify values of unauthorized addresses but not modify values of authorized addresses;
    wherein it is determined if the addresses are authorized addresses by deriving a two dimensional location on a graphics display from the addresses, and comparing the derived two dimensional location to a two dimensional range of authorized locations corresponding to a subset of the graphics display.

11. The data processing system of claim 10, further comprising:
    logic to pipeline the addresses and control signals.

12. The data processing system of claim 10, further comprising:
    logic to pass data directly between the GPU and the display memory.

13. The data processing system of claim 10, further comprising:
    logic to re-direct READ operations in a fixed range corresponding to a refresh buffer to one of multiple selectable frame buffers.

* * * * *